United States Patent [19]

Ferrie

[11] 4,214,213
[45] Jul. 22, 1980

[54] SIGNAL SELECTING SYSTEM

[75] Inventor: Ronald G. Ferrie, Pittsburgh, Pa.

[73] Assignee: RCA Corporation, New York, N.Y.

[21] Appl. No.: 845,213

[22] Filed: Oct. 25, 1977

[51] Int. Cl.$^2$ .......................... H03K 5/18; H03K 5/20
[52] U.S. Cl. .................................. 328/117; 307/355;
307/358; 328/137; 328/147; 328/154
[58] Field of Search ................ 325/56, 154, 301, 366,
325/304; 307/355, 357, 358; 328/117, 146, 147,
137, 104, 154; 364/769

[56] References Cited
U.S. PATENT DOCUMENTS 3,860,872  1/1975  Richardson et al. ................ 325/304

*Primary Examiner*—John Zazworsky
*Attorney, Agent, or Firm*—Eugene M. Whitacre; Paul J. Rasmussen; Robert L. Troike

[57] ABSTRACT

A system which selects the highest quality signal from similar signals includes a signal quality detector for each of the signals and a comparator. Each detector provides an output level indicative of the quality of the signal and these signals indicative of the quality of the signal are sequentially provided to a first input of the comparator. The comparator is responsive to signal levels indicating a higher quality signal level than that of a reference level applied to a second input of the comparator for providing that signal out of the selecting system and providing a new reference signal level indicative of the higher quality signal to the second input of the comparator.

1 Claim, 2 Drawing Figures

SIGNAL SELECTING SYSTEM

BACKGROUND OF THE INVENTION

This invention relates to an improved receiver selecting system and particularly to a system for selecting from a plurality of receivers the one receiver which provides the highest quality signal.

In mobile communication systems, the talk back range of the mobile or portable transceiver is limited because of the output power capabilities. The talk back range can be extended by placing additional receivers in strategic locations, so that during transmission from a portable or mobile unit from any location in the expected coverage area, at least one receiver will receive a signal of sufficient strength to effectively communicate to the dispatcher or main station. In the majority of cases, an acceptable signal will be present at more than one of these satellite receivers.

The audio from each satellite receiver is generally transmitted over telephone lines to a central location where electronic hardware is used to determine which receiver has the best quality audio which is then fed to a common output. The system by which the selection of the best quality signal from a number of inputs is provided, as described above, is referred to herein as the receiver selecting system. This type of system is sometimes known as "receiver voting." To further complicate matters, the signal to noise (S/N) ratio from a particular satellite receiver can change dramatically from the best choice to one that is unacceptable during a signal transmission due to "Rayleigh fading." The fading rate is determined by the channel frequency and the relative motion between the transmitting and receiving antennas. In the 900 MHz band, the fading rate can approach 10 milliseconds.

Systems or arrangements for selecting the best quality signal from a plurality of radio receivers as exemplified by U.S. Pat. No. 4,030,040 of Harbert or U.S. Pat. Nos. 3,403,341 and 3,495,175 of Munch. The signal indicative of the signal quality is compared to a common reference voltage. The reference signal in Harbert is the ramp voltage and in Munch U.S. Pat. No. 3,403,341, it is a fixed reference voltage. In the Munch, U.S. Pat. No. 3,495,175, the common reference voltage is adjusted to follow the highest quality signal where there is a separate comparison circuit including a diode coupled between each of the inputs and a common load wherein the highest quality signal forward biases its diode and back biases the other diodes. The comparison in these prior art systems is done by simultaneously comparing the plurality of signal sources to a common reference voltage to get the highest or lowest level signal. However, if the received signals are of the same or approximately the same quality, these prior art systems can cause multiple gating without some form of priority circuit. Further, this reference voltage would need to be kept precise to prevent false triggering. Also, where the reference voltage is dependent on the forward bias of a diode and back bias the others, the sensitivity is dependent on the voltage offset of the diodes and the characteristics of the diodes. Further, it is desirable to provide a system which inherently ranks the quality of the inputs and/or converts the voltage to a binary number which can be used for further processing.

SUMMARY OF THE INVENTION

A system is provided for comparing the signals from a plurality of sources to a reference signal and for gating out of the system the best quality signal and for updating the reference signal to reflect the best quality signal. The signals from the plurality of sources are sequentially provided to one input of a comparator. At the second input of the comparator a second signal is provided which is indicative of the previous best quality signal. The comparator is responsive to the signal level at the first input indicating a higher quality signal at the signal input for gating the higher quality signal out of the system and providing a new reference signal indicative of the new higher quality signal to the second input of the comparator.

DESCRIPTION OF THE INVENTION

Figure 1:
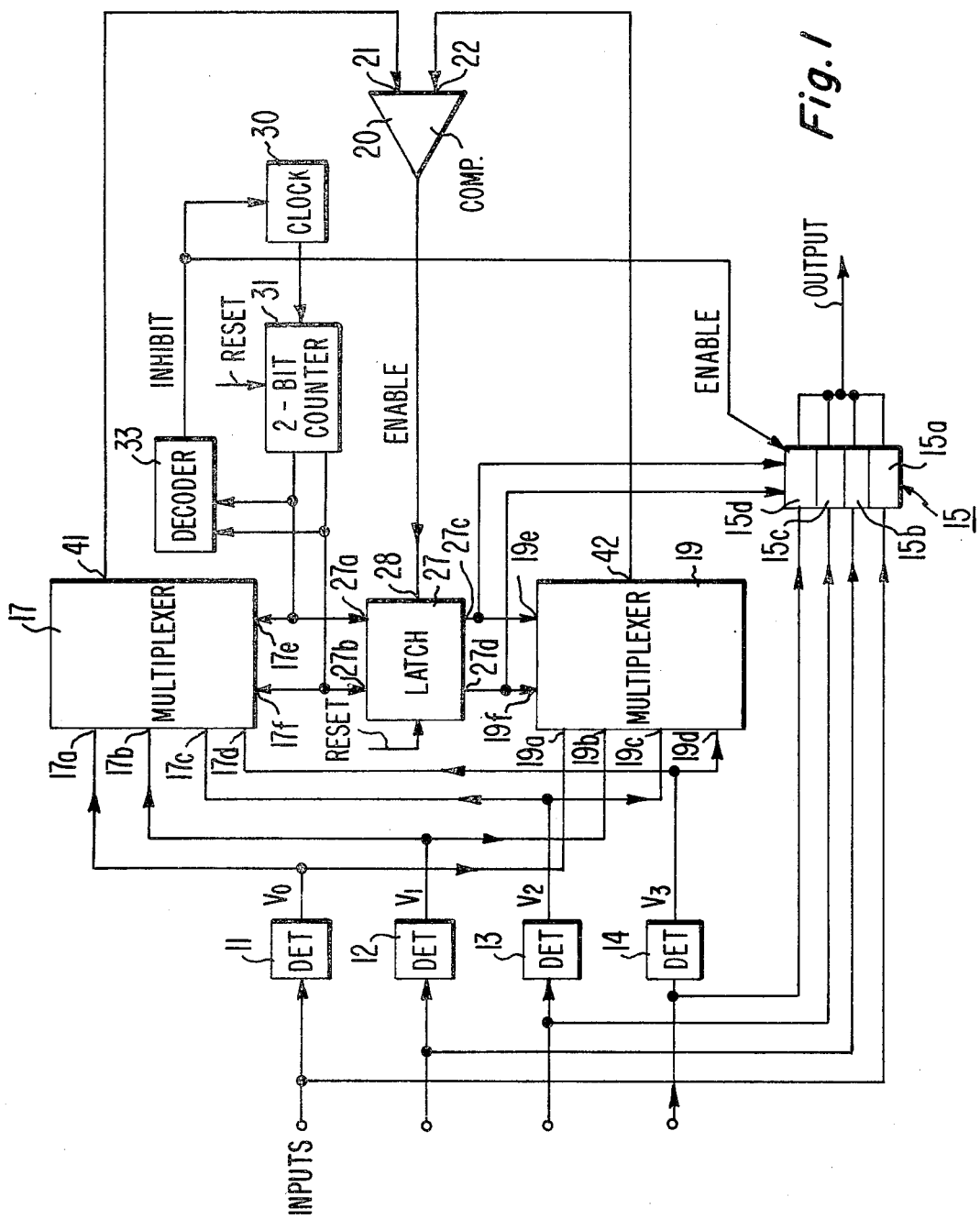
FIG. 1 is a block diagram of the basic selector system according to one embodiment of the present invention.

Referring to FIG. 1, the detectors 11, 12, 13 and 14 are each coupled for example to the separate receivers located at, for example, different sites of a city. A relatively low powered transportable transceiver located on a person or car transmits low powered electromagnetic waves. These transmitted waves may be in response to a message it receives from a base station located somewhere in the city. The receivers at the sites are adapted to receive the wave transmitted by the transceiver. The output from each of the receivers is coupled by telephone lines for example to a receiver selecting system. See for example FIG. 1 of U.S. Pat. No. 4,030,040 and corresponding description. The receiver selecting system may be at a base station location. The output of the respective receivers is coupled to the respective detectors 11 through 14 of FIG. 1. It is desirable to select a radio receiver with the best signal quality and gate that signal to the output. The input signals are also coupled to the gates 15a, 15b, 15c and 15d of latch 15. The output of these gates 15a, 15b, 15c and 15d are coupled to a common output. Detectors 11 through 14 may include for example the signal-to-noise quality detector as described for example in FIG. 6 of the above referenced patent. In this case, the signal representing the best quality is provided by a voltage of the lowest value. In the system in FIG. 1, the voltages at the output of the four detectors 11, 12, 13 and 14 are represented as four voltages $V_0$, $V_1$, $V_2$, $V_3$. It is noted that the number of inputs can be increased or decreased and the number four is used only to keep the explanation simple. The outputs from the voltage inputs $V_0$, $V_1$, $V_2$ and $V_3$ from the detectors 11 through 14 are applied separately to the separate terminals 17a, 17b, 17c and 17d of multiplexer 17. Likewise these detected voltages are separately applied to the separate terminals 19a, 19b, 19c and 19d of multiplexer 19. The switched output from the multiplexers 17 and 19 are applied to terminals 21 and 22 respectively of comparator 20. The switched positions of multiplexer 17 is controlled by the logic levels at terminals 17e and 17f of multiplexer 17. Similarly, the switched position of multiplexer 19 is controlled by the logic levels at terminals 19e and 19f of multiplexer 19. A 2-bit latch 27 has a first pair of terminals 27a and 27b coupled to terminals 17e and 17f of multiplexer 17 and has a second pair of terminals 27c and 27d coupled to respective terminals 19e and 19f of multiplexer 19. A 2-bit counter 31 is responsive to clock pulses from clock pulse generator 30 to provide logic level signals to terminals 17e and 27a and to terminals 17f and 27b. Also, a decoder 33 is responsive after four clock pulses for inhibiting further clock pulses and for applying enabling signals to latch 15. The output of comparator 20 is coupled to terminal 28 of the latch 27.

Referring to FIG. 1, assuming that reset signal applied to counter 31 and latch 27 is removed, the outputs from the 2-bit counter 31 is initially zero level to terminals 17e, 27a, 17f and 27b. Also, the outputs from terminal 27c and 27d of latch 27 are both zero levels and therefore the input to terminals 19e and 19f are both zero levels. Under these conditions, the multiplexers 17 and 19 each connect the voltage $V_0$ to respective outputs 41 and 42, and therefore the inputs at terminals 21 and 22 of comparator 20 are both equal and the output level from comparator 20 is a zero causing the latch 27 not to be enabled. The logic level of both zeros at terminals 27c and 27d cause gate 15a to be addressed. Latch 15 will be enabled only at the last state (logic 11 state) and will output the addressed gate. After the first clock pulse counter 31 increments one count, the output at terminal 17e and 27a becomes a logic one level while terminals 17f and 27b are at a zero level. This logic level at multiplexer 17 causes this multiplexer to connect the $V_1$ voltage to the output 41 of the multiplexer. Since latch 27 is not enabled, multiplexer 19 continues to apply $V_0$ voltage at the output thereof. Consequently, the voltage of $V_0$ is applied to terminal 22 of the comparator 20. If the voltage at terminal 22 is less than that of terminal 21 indicating $V_0$ voltage is a higher quality signal nothing happens and the logic level at terminals 27c and 27d remains zero and system continues to address gate 15a. If on the other hand $V_1$ voltage is less than $V_0$ voltage, the comparator 20 output goes to a logic one level enabling the latch 27 causing the latch 27 to change to its output logic state at terminals 27c and 27d to equal its input logic states at terminals 27a and 27b and the multiplexer 19 is switched to provide the voltage $V_1$ to terminal 22 of the comparator 20. The voltage $V_1$ then becomes the new reference voltage and since $V_1$ is now applied also to terminal 22 of comparator 20, the output of comparator 20 becomes zero and the latch 27 is disabled. The change in logic state at terminals 27c and 27d cause gate 15b only to be addressed. The system then awaits the arrival of the next clock pulse which causes the voltage of $V_1$ to be compared to $V_2$. This process continues with each additional clock pulse until all inputs have been compared. Note that after each clock pulse, the number of the lowest input voltage found is stored at terminals 27c and 27d of latch 27 and after all inputs have been compared, the number with the lowest level indicating the highest quality signal is stored in the latch 27. This logic level stored in binary form in latch 27 is coupled to decoders associated with latch 15 and the gates 15a, 15b, 15c and 15d. The logic level at terminals 27c and 27d determines which of the four gates is addressed and which of the four inputs is gated out of the system at the end of the comparison when the latch 15 is enabled. When all of the inputs have been compared after the fourth clock pulse at which time the levels to terminals 17e and 17f are both logic one levels, the decoder 33 detects that state to provide a logic one inhibiting level to the clock 30 and an enable level to latch 15. The gates 15a, 15b, 15c or 15d are addressed as determined by the logic number at terminals 27c and 27d in latch 27 and the enabled gate will remain enabled until the next enable signal at end of the next comparison. If it were desired to determine which input had the greatest value rather than the least, comparator 20 input terminals 21 and 22 would be interchanged. The reset pulses to latch 27 and counter 31 will come from a pulse generator circuit in which the frequency of the pulse will depend upon how often the four inputs will be compared.

Figure 2:
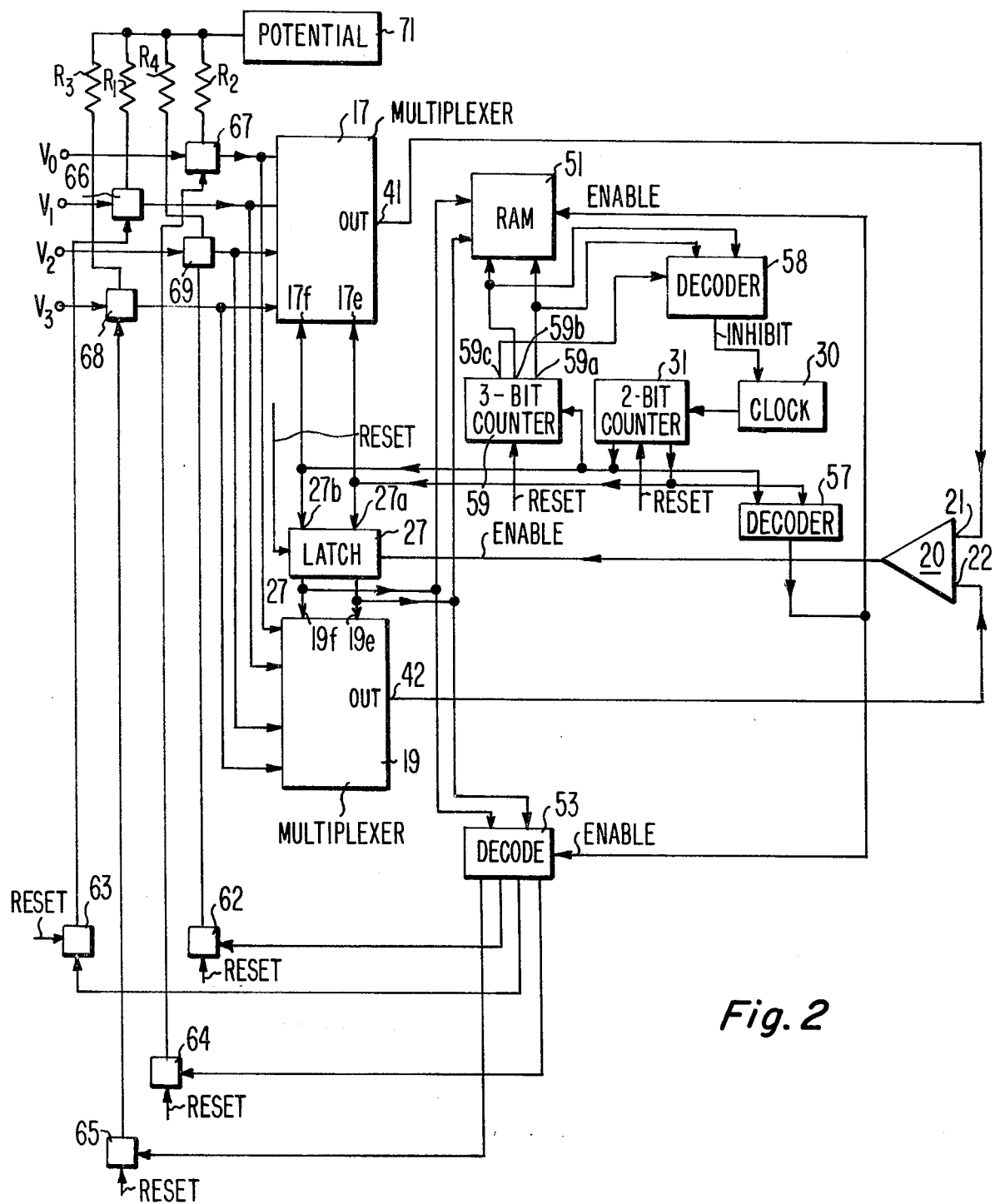
FIG. 2 is an extension of the embodiment of FIG. 1 with means for ranking all of the input signals.

Referring to FIG. 2, an extension of the above measuring principle can be used to rank all of the inputs. The elements 17, 19, 20, 27, 30 and 31 are like that in FIG. 1. In addition, there is included a R.A.M. (Random Access Memory) 51 and a binary to digital decoder 53 coupled to terminals 27c and 27d of latch 27. Latches 62, 63, 64 and 65 are coupled between decoder 53 and gates 66, 67, 68 and 69. These gates 66, 67, 68 and 69 are coupled to the four inputs to multiplexers 17 and 19. A source of potential 71 is separately coupled via separate isolation resistors $R_1$, $R_2$, $R_3$ and $R_4$ to the gates 66, 67, 68 and 69. A decoder 57 is coupled between the 2-bit counter 31 and the enabling gates of R.A.M. 51 and decoder 53. Also, a 3-bit counter 59 is coupled to one output of the 2-bit counter 31 with two terminals 59a and 59b of counter 59 coupled to the R.A.M. 51 and decoder 58. One terminal 59c of decoder 59 is also coupled directly to decoder 58 providing a 3-bit word to decoder 58. The output of decoder 58 provides inhibiting signal to the clock 30.

In the operation of the system of FIG. 2, the first measurement would be as already described producing for example the least of all the voltages. The first measurement would determine the best quality signal and store its address in R.A.M. 51 at address 00 ($59a=0$, $59b=0$). Simultaneously, decoder 57 responsive to the count of four clock pulses from 2-bit counter 30 (logic 11) enables decoder 53 which sets the latch (from group of latches 62 thru 65) which corresponds to the best signal. The gate activated (gate 67 for example) would remove the best quality signal from the input to multiplexer 17 and substitute a worse-case signal from potential source 71. This is provided by applying a high level signal from source 71. For the next measurement, the best signal would not be a candidate (for example $V_0$ would not be a candidate) and the next best signal would be found and its address stored in R.A.M. 51 at address 01 ($59a=0$, $59b=1$). Again, the next best signal would be removed from the measuring process by means of its corresponding latch (62 thru 65) and associated gate (66 thru 69). This process will continue until all of the signals have been ranked and their address stored in R.A.M. 51. After the four signal addresses are stored in R.A.M. 51, terminal 59c of the 3-bit counter 59 will go to logic level "one" and 59a and 59b will each be at logic level "zero." This will cause decoder 58 (by the 3-bit word 100) to apply an inhibit signal to clock 30 and terminate the measurement until a new reset pulse is applied to counters 31, 59 and latches 27, 62, 63, 64 and 65.

In the arrangement of FIG. 1, the four input multiplexers 17 and 19 may be an RCA type CD4051A, sold by RCA Solid State Division, Somerville, N.J., the 2-bit latch 27 an RCA type CD4042A, the 2-bit counter 31 an RCA type CD4024A, clock 30—similar to that described in application note ICAN-6267 entitled "A Stable and Monostable Oscillator Using RCA COSMOS Digital Integrated Circuits" published by RCA Solid State Division, Somerville, N.J. 08876, Comparator 20 an RCA type CA 3099E. For the arrangement of FIG. 2, multiplexers 17 and 19 may be an RCA type CD4051A, the latch 27 an RCA type CD 4042A, the counter 31 an RCA type CD4024A, clock 30—similar to that described in the above mentioned application note ICAN-6267, comparator 20 an RCA type CA3099E, decoders 57, 58 and 53 may be binary to decimal decoders, counter 59 a 3-bit counter like RCA type CD4024A, R.A.M. 51 similar to RCA type CD4036A, latches 62 thru 65 similar to RCA type CD4043A.

What is claimed is:

1. A signal selecting system responsive to signals from a plurality of signal sources for rapidly comparing and selecting the best quality signal, comprising:
   a plurality of detectors with a detector coupled to and responsive to each one of said sources for continuously detecting the quality of said signals from said sources for thereby continuously and simultaneously providing from each detector detected signals indicative of the quality of the signal present at the source,
   a comparator,
   means coupled to said plurality of detectors for sequentially coupling said detected signals from said plurality of sources to a first input of said comparator,
   reference means coupled to said plurality of detectors for coupling the detected signals from a selected one of said sources to a second input of said comparator,
   said comparator being responsive to the simultaneously and continuously detected signals at said first and second inputs thereof for providing a control signal when the signal at said first input indicates a better quality signal than at said second input,
   said reference means including means coupled to said first means and responsive to said control signal for providing a signal indicative of the source of the detected signal coupled to the first input of the comparator and for gating the detected signal corresponding to said indicative signal to the second input of said comparator, and
   means responsive to said indicative signal and coupled to said plurality of sources for gating that source corresponding to said indicative signal out of the system.

\* \* \* \* \*